United States Patent
Lee et al.

(10) Patent No.: US 11,096,202 B2
(45) Date of Patent: Aug. 17, 2021

(54) METHOD FOR D2D OPERATION OF TERMINAL IN WIRELESS COMMUNICATION SYSTEM AND TERMINAL USING SAID METHOD

(71) Applicant: LG ELECTRONICS INC., Seoul (KR)

(72) Inventors: Seungmin Lee, Seoul (KR); Hyunho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 44 days.

(21) Appl. No.: 16/611,473

(22) PCT Filed: May 8, 2018

(86) PCT No.: PCT/KR2018/005247
§ 371 (c)(1),
(2) Date: Nov. 6, 2019

(87) PCT Pub. No.: WO2018/208054
PCT Pub. Date: Nov. 15, 2018

(65) Prior Publication Data
US 2020/0170031 A1  May 28, 2020

Related U.S. Application Data

(60) Provisional application No. 62/505,891, filed on May 13, 2017, provisional application No. 62/502,610, filed on May 6, 2017.

(51) Int. Cl.
*H04W 72/12* (2009.01)
*H04L 5/00* (2006.01)
*H04W 92/18* (2009.01)

(52) U.S. Cl.
CPC ....... *H04W 72/1273* (2013.01); *H04L 5/0007* (2013.01); *H04L 5/0044* (2013.01); *H04W 72/1257* (2013.01); *H04W 92/18* (2013.01)

(58) Field of Classification Search
CPC ......... H04W 72/1273; H04W 72/1257; H04W 92/18; H04W 52/16; H04W 72/02;
(Continued)

(56) References Cited

U.S. PATENT DOCUMENTS

2012/0201154 A1  8/2012  Chandrasekhar et al.
2017/0273026 A1*  9/2017  Fakoorian ............... H04W 4/70
(Continued)

FOREIGN PATENT DOCUMENTS

CN  105850177  8/2016
KR  20170022826  3/2017
(Continued)

OTHER PUBLICATIONS

PCT International Application No. PCT/KR2018/005247, International Searching Authority dated Aug. 16, 2018, 5 pages.
(Continued)

*Primary Examiner* — Alex Skripnikov
*Assistant Examiner* — Sharmin Chowdhury
(74) *Attorney, Agent, or Firm* — Lee Hong Degerman Kang Waimey

(57) ABSTRACT

The present invention provides a method for carrying out S-TTI-based communication performed by a terminal supporting a relatively short transmission time interval (S-TTI) compared to a legacy transmission time interval (L-TTI) in a wireless communication system. The method is characterized by: determining a value with respect to a ratio of reference signal energy per resource element (RS EPRE) to physical downlink shared channel energy per resource element (PDSCH EPRE); and carrying out S-TTI-based communication on the basis of the value with respect to the ratio, wherein the value with respect to the ratio is determined in an S-TTI unit.

11 Claims, 13 Drawing Sheets

(58) Field of Classification Search
CPC .... H04W 72/04; H04W 72/12; H04L 5/0007; H04L 5/0044
See application file for complete search history.

(56) References Cited

U.S. PATENT DOCUMENTS

| | | | |
|---|---|---|---|
| 2017/0303206 A1* | 10/2017 | Cheng | H04W 72/12 |
| 2018/0227912 A1* | 8/2018 | Chen | H04L 5/001 |
| 2018/0324797 A1* | 11/2018 | Hosseini | H04L 1/0026 |
| 2020/0305129 A1* | 9/2020 | Lee | H04W 72/0446 |

FOREIGN PATENT DOCUMENTS

| | | |
|---|---|---|
| WO | 2016117984 | 7/2016 |
| WO | 2017053637 | 3/2017 |
| WO | 2017074520 | 5/2017 |

OTHER PUBLICATIONS

LG Electronics, "Discussion on dynamic switching between 1ms TTI and sTTI," 3GPP TSG-RAN WG1 #88, R1-1702419, Feb. 2017, 5 pages.
Ericsson, "WF L1 configurations for multicast in FeMTC," 3GPP TSG-RAN WG1 #88, R1-1703516, Feb. 2017, 6 pages.
Qualcomm, "Email discussion [90-10] on sTTI CSI Reporting," 3GPP TSG-RAN WG1 #90b, R1-1718119, Oct. 2017, 21 pages.
European Patent Office Application Serial No. 18798534.6, Search Report dated Mar. 19, 2020, 9 pages.
ITRI, "Discussion on CSI reporting for sTTI operation", 3GPP TSG RAN WG1 Meeting #88bis, R1-1705537, Apr. 2017, 2 pages.

* cited by examiner

METHOD FOR D2D OPERATION OF TERMINAL IN WIRELESS COMMUNICATION SYSTEM AND TERMINAL USING SAID METHOD

CROSS-REFERENCE TO RELATED APPLICATIONS

This application is the National Stage filing under 35 U.S.C. 371 of International Application No. PCT/KR2018/005247, filed on May 8, 2018, which claims the benefit of U.S. Provisional Application No. 62/502,610, filed on May 6, 2017, and 62/505,891, filed on May 13, 2017, the contents of which are all hereby incorporated by reference herein in their entireties.

BACKGROUND

Field

The present document relates to wireless communication, and more particularly, to a method for a D2D operation of a terminal in a wireless communication system and a terminal using the method.

Related Art

In the International Telecommunication Union Radio Communication Sector (ITU-R), standardization of International Mobile Telecommunication (IMT)-Advanced, a next generation mobile communication system after 3rd generation, is underway. IMT-Advanced aims to support IP (Internet Protocol) based multimedia service at data rates of 1 Gbps in a stationary and low-speed moving state and 100 Mbps in a high-speed moving state.

The 3rd Generation Partnership Project (3GPP) is a system standard that meets the requirements of IMT-Advanced, and LTE-Advanced (LTE-A), which has improved Long Term Evolution (LTE) based on Orthogonal Frequency Division Multiple Access (OFDMA)/Single Carrier-LTE-Advanced (LTE-A), is being prepared. LTE-A is one of the strong candidates for IMT-Advanced.

Recently, the interest in device-to-device (D2D) technology for direct communication between devices is increasing. In particular, the D2D is drawing attention as a communication technology for a public safety network. Commercial communication networks are rapidly changing to LTE, but current public safety networks are mainly based on 2G technology in terms of conflict and cost with the existing communication standards. The technical gap and the need for improved services are leading to efforts to improve the public safety networks.

In the present document, when a terminal (or base station) performs S-TTI-based wireless communication, there is a need to provide a configuration for supporting the S-TII-based wireless communication.

SUMMARY

The present document provides a method for a D2D operation of a terminal in a wireless communication system and a terminal using the method.

In an aspect, a method for S-TTI-based communication performed by a terminal supporting a short transmission time interval (S-TTI) that is relatively shorter compared to a legacy transmission time interval (L-TTI) in a wireless communication system is provided. The method may comprise determining a value with respect to a ratio of a reference signal energy per resource element (RS EPRE) to a physical downlink shared channel (PDSCH) energy (PDSCH energy per resource element (PDSCH EPRE)) and performing the S-TTI based communication based on the value with respect to the ratio, and determining the value with respect to the ratio in the S-TTI unit.

The method may further comprise determining whether RS is received in a specific S-TTI among a plurality of S-TTIs.

When the RS is not received in the specific S-TTI, a value with respect to a ratio related to transmission power of a downlink channel on the specific S-TTI may be additionally signaled.

The downlink channel may include an S-TTI based PDSCH (S-PDSCH) or an S-TTI based physical downlink control channel (S-PDCCH).

When the RS is not received in the specific S-TTI, a value with respect to a ratio related to transmission power of a downlink channel on the specific S-TTI may be set to follow a value with respect to a ratio applied to the S-TTI to which the RS is transmitted among the plurality of S-TTIs.

When the RS is not received in the specific S-TTI, as a value with respect to a ratio related to transmission power of a downlink channel on the specific S-TTI, a sum of a value with respect to a ratio applied to the S-TTI to which the RS may be transmitted among the plurality of S-TTIs and a preset offset value is applied.

The method may further comprise determining whether one S-TTI based physical downlink control channel (S-PDCCH) schedules an S-TTI based PDSCH (S-PDSCH) on a plurality of S-TTIs.

When the one S-PDCCH schedules the S-PDSCH on the plurality of S-TTIs, the value with respect to the ratio may be equally applied to the plurality of S-TTIs.

When the S-TTI to which the RS is transmitted among the plurality of S-TTIs, a value with respect to a ratio for the S-TTI to which the RS may be transmitted is applied to the plurality of S-TTIs.

When the one S-PDCCH schedules the S-PDSCH on the plurality of S-TTIs, a value with respect to a ratio may be signaled in units of the plurality of S-TTIs.

When the one S-PDCCH schedules the S-PDSCH on the plurality of S-TTIs, an average value of values with respect to a ratio related to the plurality of S-TTIs may be applied to the plurality of S-TTIs.

When the one S-PDCCH schedules the S-PDSCH on the plurality of S-TTIs, a value with respect to a ratio related to a preset S-TTI among the plurality of S-TTIs may be applied to the plurality of S-TTIs.

In another aspect, a method for S-TTI-based communication performed by a terminal supporting a short transmission time interval (S-TTI) that is relatively shorter compared to a legacy transmission time interval (L-TTI) in a wireless communication system is provided. The method may comprise determining a value with respect to a ratio of a reference signal energy per resource element (RS EPRE) to a physical downlink shared channel (PDSCH) energy (PDSCH energy per resource element (PDSCH EPRE)) and performing the S-TTI based communication based on the value with respect to the ratio, and determining the value with respect to the ratio for each restricted CSI measurement set when restricted channel state information (CSI) measurement is signaled for each S-TTI set.

A value for a ratio of a symbol in which RS is received may be set differently for each of the restricted CSI measurement sets, and a value with respect to a ratio of a symbol in which the RS is not received may be equally for all restricted CSI measurement sets.

In other aspects, a terminal supporting a short transmission time interval (S-TTI) that is relatively shorter compared to a legacy transmission time interval (L-TTI) in a wireless communication system is provided. The method may comprise a radio frequency (RF) transceiver configured to transmit and receive a radio signal and a processor configured to be operated in combination with the RF transceiver, wherein the processor determines a value with respect to a ratio of a reference signal energy per resource element (RS EPRE) to a physical downlink shared channel (PDSCH) energy (PDSCH energy per resource element (PDSCH EPRE)), and performs the S-TTI based communication based on the value with respect to the ratio and performs the value with respect to the ratio in the S-TTI unit.

According to the present document, the ratio of the RS EPRE to the PDSCH EPRE may be determined in the S-TTI unit.

In addition, according to the present document, if there is no RS on the particular S-TTI, the method for determining a ratio of RS energy to PDSCH energy may also be provided.

DESCRIPTION OF EXEMPLARY EMBODIMENTS

Hereinafter, terms or abbreviations that are not separately defined may be defined in 3GPP TS 36 series or TS 38 series.

Figure 1:
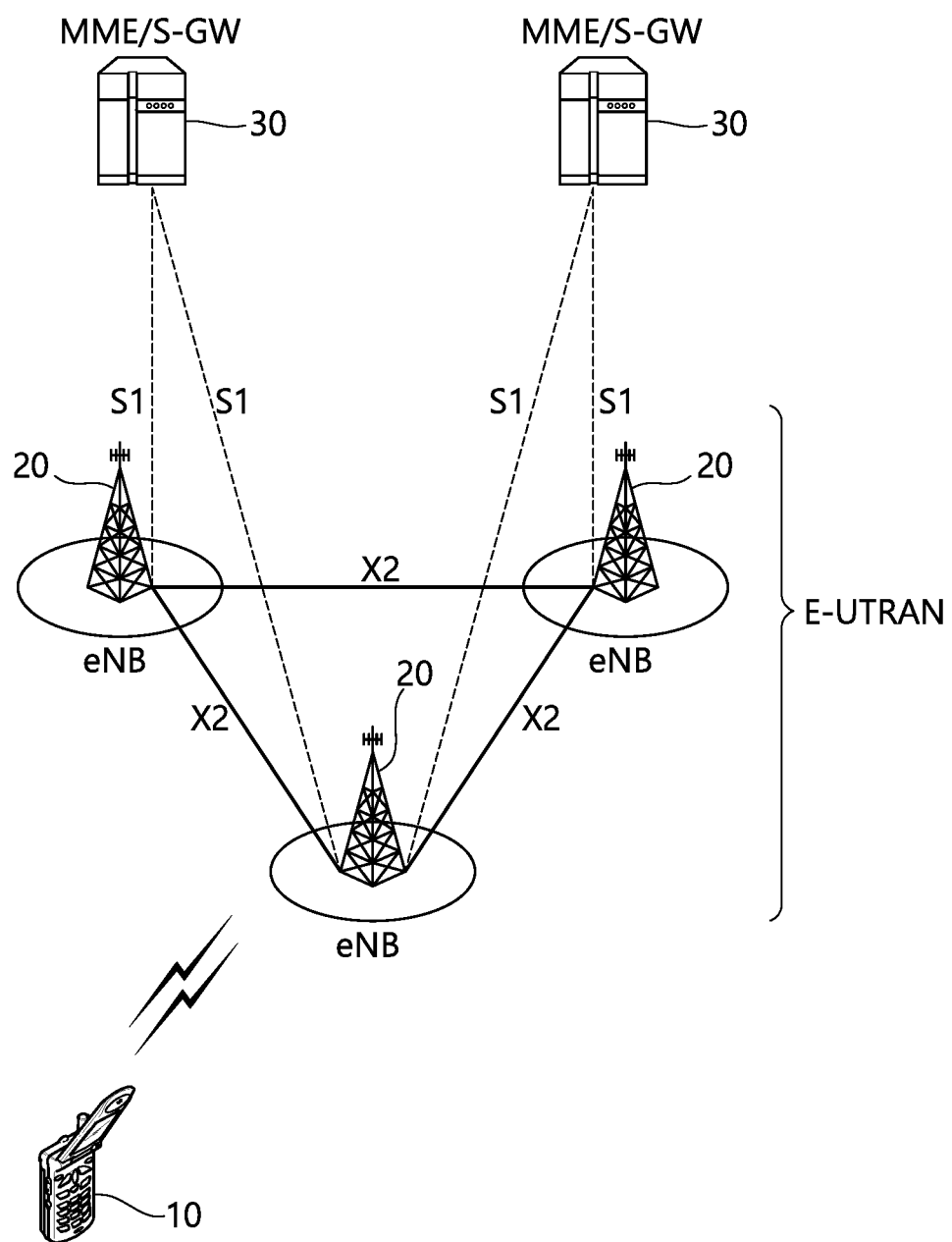
FIG. 1 illustrates a wireless communication system.

FIG. 1 illustrates a wireless communication system. This may also be called an evolved-UMTS terrestrial radio access network (E-UTRAN), or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
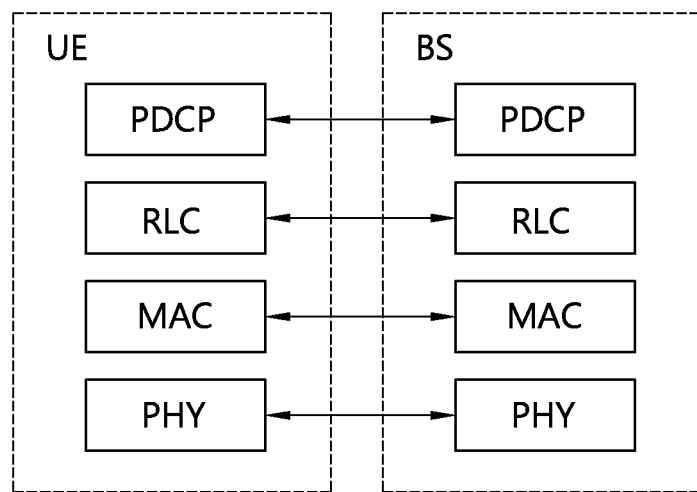
FIG. 2 is a diagram showing a wireless protocol architecture for a user plane.
Figure 3:
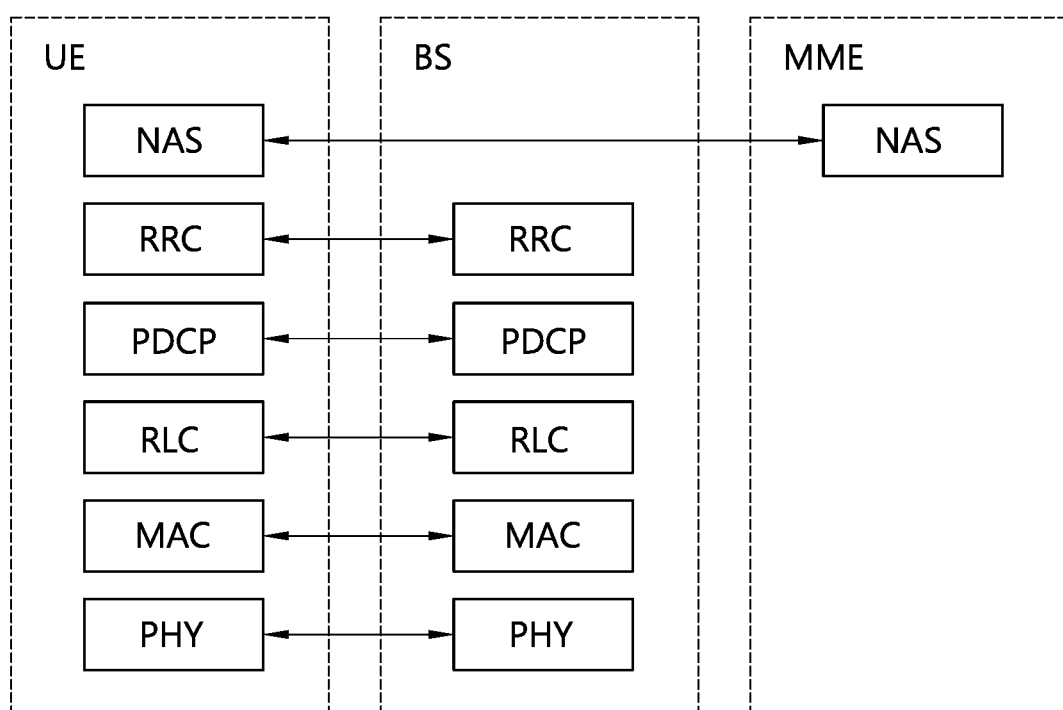
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel A Transmission Time Interval (TTI) is a unit time for subframe transmission.

Hereinafter, a new radio access technology (new RAT) will be described. The new radio access technology may be abbreviated as new radio (NR).

As more communication devices require larger communication capacities, there is a need for improved mobile broadband communication compared to the existing radio access technology (RAT). In addition, massive machine type communications (MTC), which connects between multiple devices and objects to provide various services anytime and anywhere, is also one of the major issues to be considered in next-generation communication. In addition, communication system designs considering services/terminals that are sensitive to reliability and latency have been discussed. The introduction of the next-generation wireless access technologies in consideration of such enhanced mobile broadband communication, the massive MTC, ultra-reliable and low latency communication (URLLC), and the like, have been discussed, and in the present document, for convenience, the technology is referred to as new RAT or NR.

Figure 4:
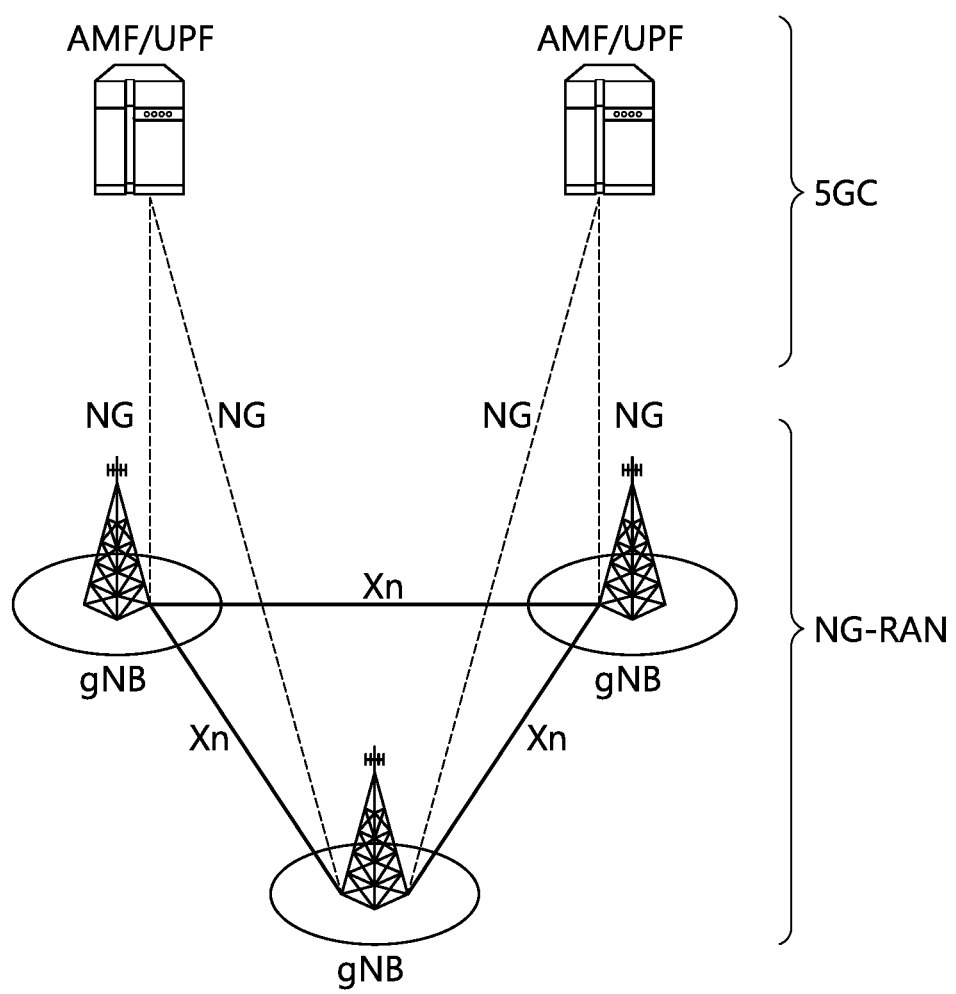
FIG. 4 illustrates a system structure of a new generation radio access network (NG-RAN) to which the NR is applied.

FIG. 4 illustrates a system structure of a new generation radio access network (NG-RAN) to which the NR is applied.

Referring to FIG. 4, the NG-RAN may include gNB and/or eNB that provides user plane and control plane protocol termination to a terminal. FIG. 4 illustrates a case of including only the gNB. The gNB and the eNB are connected to each other via an Xn interface. The gNB and the eNB are connected to a 5G core network (5GC) via an NG interface. More specifically, the gNB and the eNB are connected to an access and mobility management function (AMF) via an the NG-C interface, and are connected to a user plane function (UPF) via an NG-U interface.

Figure 5:
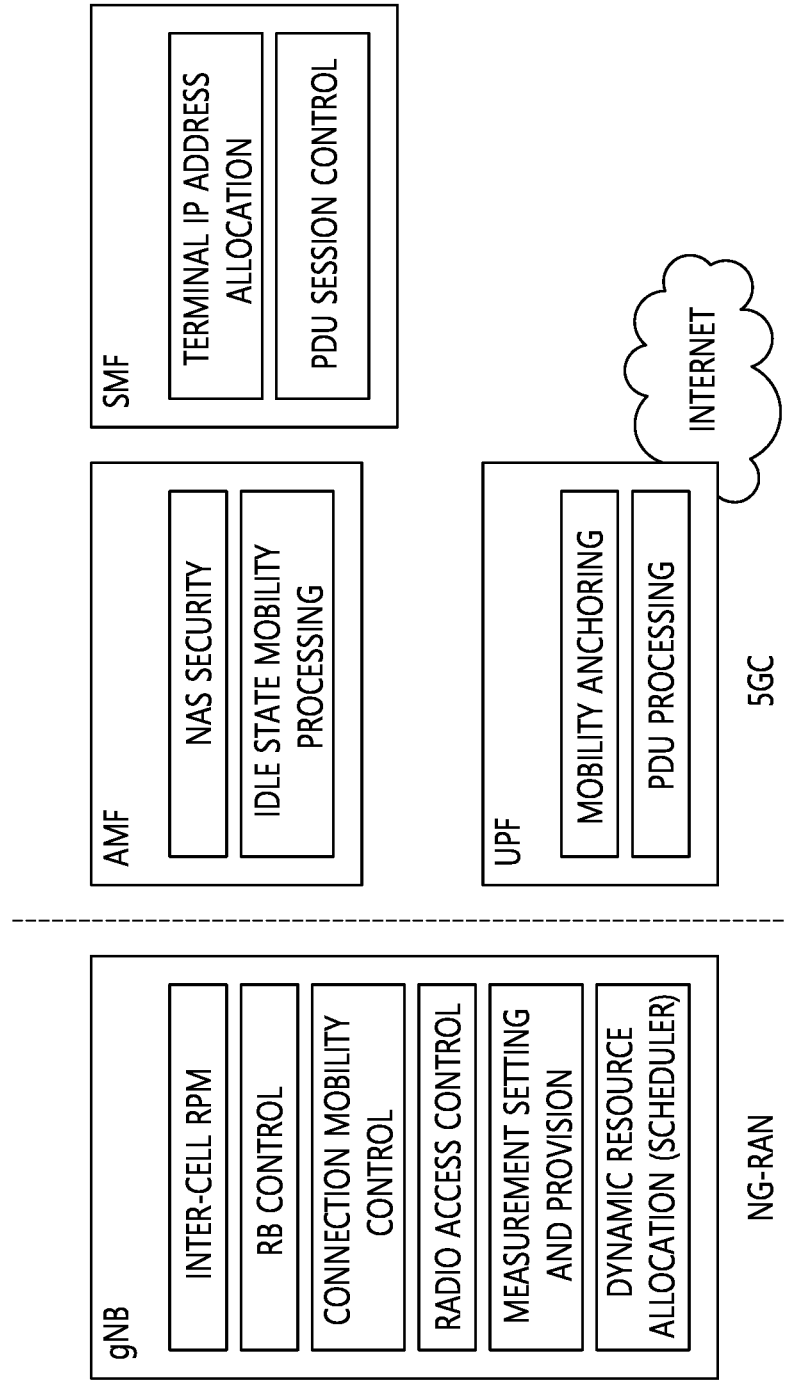
FIG. 5 illustrates a functional division between the NG-RAN and the 5GC.

FIG. 5 illustrates a functional division between the NG-RAN and the 5GC.

Referring to FIG. 5, the gNB may provide functions such as inter-cell radio resource management (inter cell RRM), radio bearer management (RB control), connection mobility control, radio admission control, and measurement configuration and provision, and dynamic resource allocation. The AMF may provide functions such as NAS security and idle state mobility processing. The UPF may provide functions such as mobility anchoring and PDU processing. The session management function (SMF) may provide functions such as terminal IP address allocation and PDU session control.

Figure 6:
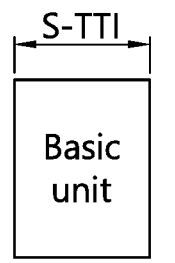
FIG. 6 schematically illustrates an example of S-TTI and L-TTI.
Figure 6:
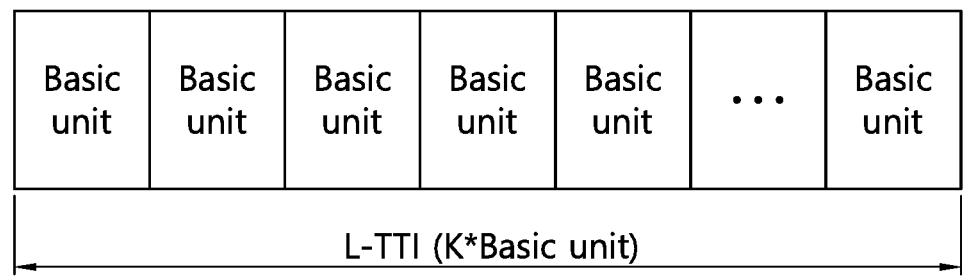

FIG. 6 schematically illustrates an example of S-TTI and L-TTI.

Referring to FIG. 6, when the S-TTI is defined as a basic resource unit that is preset (/signaled), the L-TTI may be interpreted in a form in which preset (/signaled) K S-TTIs (basic resource units) are combined.

Figure 7:
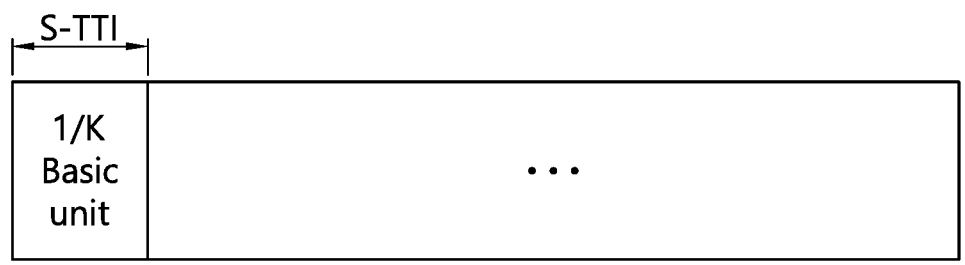
FIG. 7 schematically illustrates another example of the S-TTI and the L-TTI.
Figure 7:
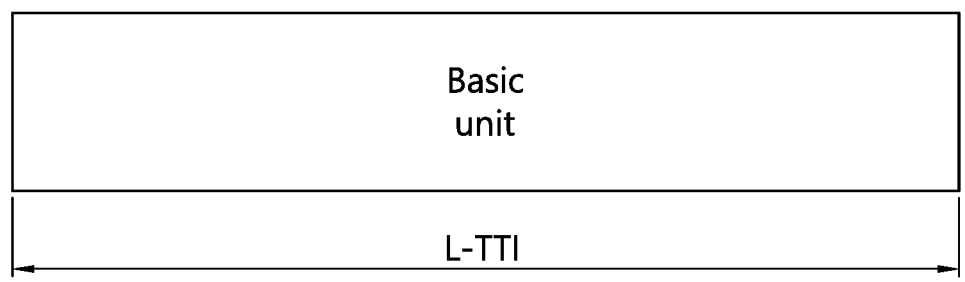

FIG. 7 schematically illustrates another example of the S-TTI and the L-TTI.

Referring to FIG. 7, when the L-TTI is defined as a basic resource unit that is preset (/signaled), the S-TTI may be interpreted in a form (for example, a kind of mini-basic resource units) in which the L-TTI (basic resource unit) is divided into the (preset (/signaled)) K number.

Unlike the example of the above drawing, the S-TTI may also have a form in which a plurality of (preset (/signaled)) basic resource units are combined.

Figure 8:
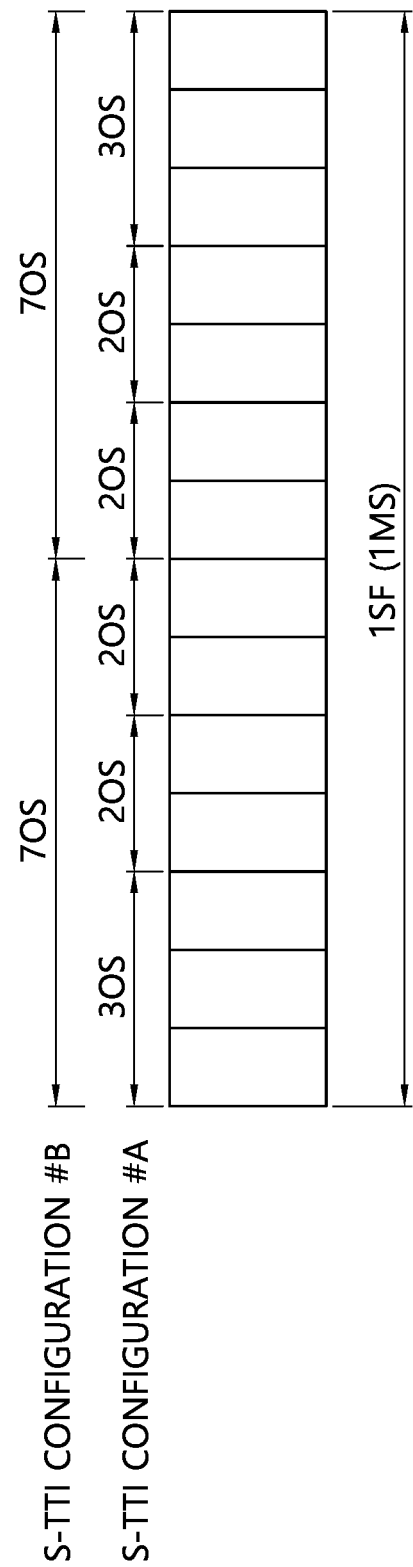
FIG. 8 schematically illustrates another example of the S-TTI and the L-TTI.

FIG. 8 schematically illustrates another example of the S-TTI and the L-TTI.

Referring to FIG. 8, for example, as in S-TTI configuration # A, a first S-TTI may have a length of three OFDM symbols (OS), a second S-TTI may have a length of two OFDM symbols, a third S-TTI may have a length of two OFDM symbols, a fourth S-TTI may have a length of two OFDM symbols, a fifth S-TTI may have a length of two OFDM symbols, and a sixth S-TTI may have a length of three OFDM symbols.

Alternatively, for example, as in S-TTI configuration # B, a first S-TTI may have a length of seven OFDM symbols, and a second S-TTI may also have a length of seven OFDM symbols.

So far, various examples of the relationship between the S-TTI and the L-TTI have been shown. However, examples of various S-TTI and L-TTI described above are merely examples for convenience of description, and the forms of the S-TTI and L-TTI are not limited to the forms disclosed above.

Hereinafter, the present document will be described.

As described above, in future wireless communication systems, S-TTI based wireless communication systems are supported.

Accordingly, when a terminal performs wireless communication in a specific cell, it may receive interference in an S-TTI unit (from a neighboring cell providing S-TTI based wireless communication).

For convenience of understanding, an example in which a serving cell receives interference in an S-TTI unit from a neighboring cell and an example of interference in an L-TTI unit will be described below with reference to the accompanying drawings.

Figure 9:
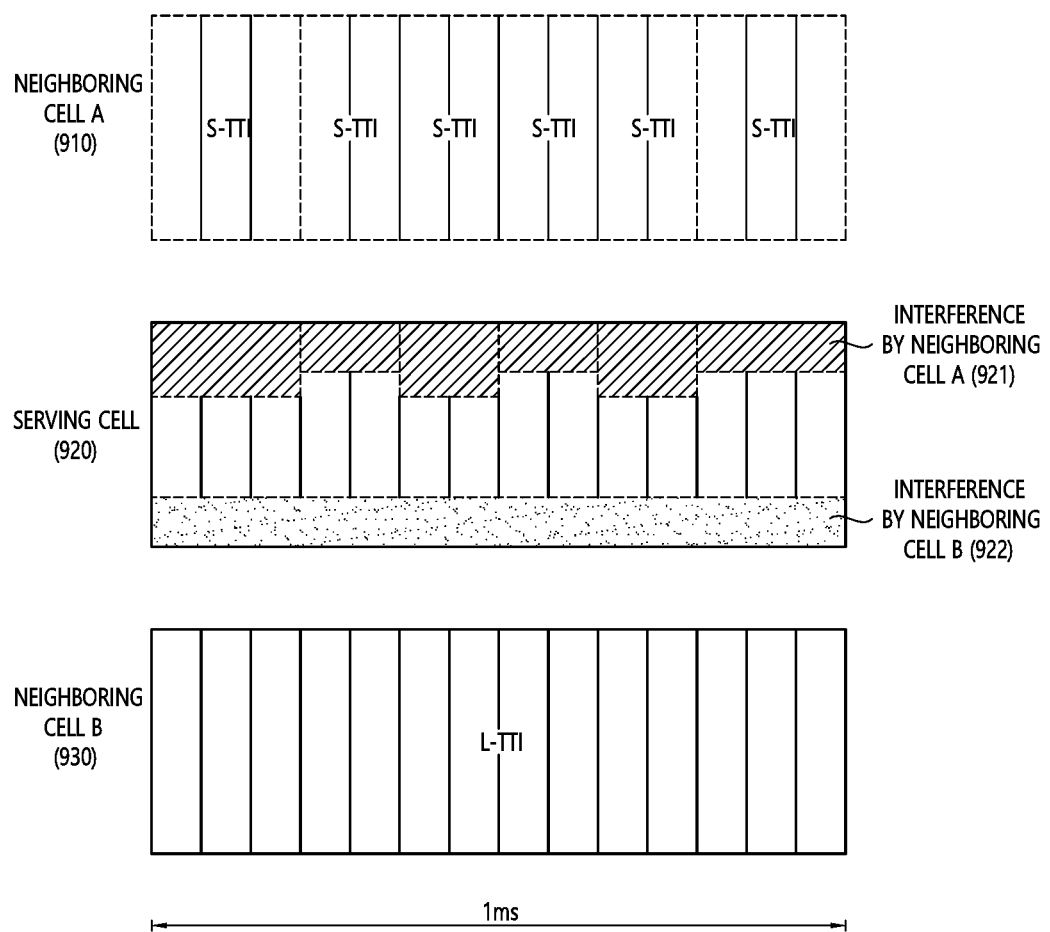
FIG. 9 schematically illustrates an example in which a serving cell is subjected to interference from a neighboring cell.

FIG. 9 schematically illustrates an example in which a serving cell is subjected to interference from a neighboring cell.

Referring to FIG. 9, there may be a neighboring cell A 910 providing S-TTI based wireless communication and a neighboring cell B 930 providing L-TTI based wireless communication. In this case, a serving cell 920, which is a cell in which a terminal performs a wireless communication system, may be subjected to interference 921 by the neighboring cell A and/or interference 922 by the neighboring cell B.

As can be seen in FIG. 9, the serving cell 920 may be subjected to interference in the S-TTI unit by the neighboring cell A 910, and may be subjected to interference in the L-TTI unit by the neighboring cell B 930.

Conventionally, a ratio of RS energy to PDSCH energy (for example, a ratio of a reference signal (RS) energy per resource element (EPRE) to a physical downlink shared channel (PDSCH) EPRE) for interference relaxation is determined in a subframe unit (that is, L-TTI unit). However, as described above, upon performing the S-TTI-based wireless communication in the neighboring cell, the interference occurs in the S-TTI unit. To efficiently overcome the interference, the present document is to provide a configuration for determining the ratio of the RS (for example, CRS) EPRE to the PDSCH EPRE.

For example, in the L-TTI (that is, legacy subframe), a (cell-specific) RS (for example, CRS) is transmitted in every subframe. However, when the L-TTI is divided into a plurality of S-TTIs, the corresponding RS (for example, CRS) transmissions do not exist on all the S-TTIs. Accordingly, the present document also provides a method for determining a ratio of RS energy to PDSCH energy in the case of the S-TTI in which there is no corresponding RS (for example, CRS) transmission.

Also, as one example of the suggested methods below, a method for efficiently carrying out a (S-TTI-based) channel/signal (for example, S-PDCCH/PDSCH, S-PUCCH/PUSCH) transmission/reception operation in consideration of different external interference (pattern/level/amount) per S-TTI (SET) with different lengths when S-TTI based communication is performed is suggested.

In the present document, the following abbreviations may be defined.

L-TTI: Refer to the operation based on the existing (LEGACY) 1MS length (or the number of symbols greater than S-TTI). In this case, L-TTI TX/RX: Refer to L-TTI-based channel/signal transmission/reception.

S-TTI: Refer to an operation based on the number of symbols smaller than L-TTI. In this case, S-TTI TX/RX: Refer to S-TTI-based channel/signal transmission/reception.

S-PDCCH/PDSCH, S-PUCCH/PUSCH: Refer to S-TTI based PDCCH/PDSCH and PUCCH/PUSCH, respectively.

L-PDCCH/PDSCH, L-PUCCH/PUSCH: Refer to L-TTI-based PDCCH/PDSCH and PUCCH/PUSCH, respectively.

The matters assumed/considered in the present document are as follows.

In a symbol in which preset (/signaled) reference signal (reference signal (RS)) is transmitted, the "ratio of RS energy per resource element (EPRE) to PDSCH EPRE" is named "RHO_A (for example, UE-specific parameter)", and in a symbol in which the corresponding RS is not transmitted, the "ratio of RS EPRE to PDSCH EPRE" is named "RHO_B (for example, cell-specific parameter)".

Ex) The "reference signal" wording may be (restrictively) interpreted as CRS (or CSI-RS or DM-RS).

Ex) The RHO_B may be derived (/calculated) as the "RHO_A" and the "ratio of RHO_A to RHO_B" signaled from the network (or base station).

Figure 10:
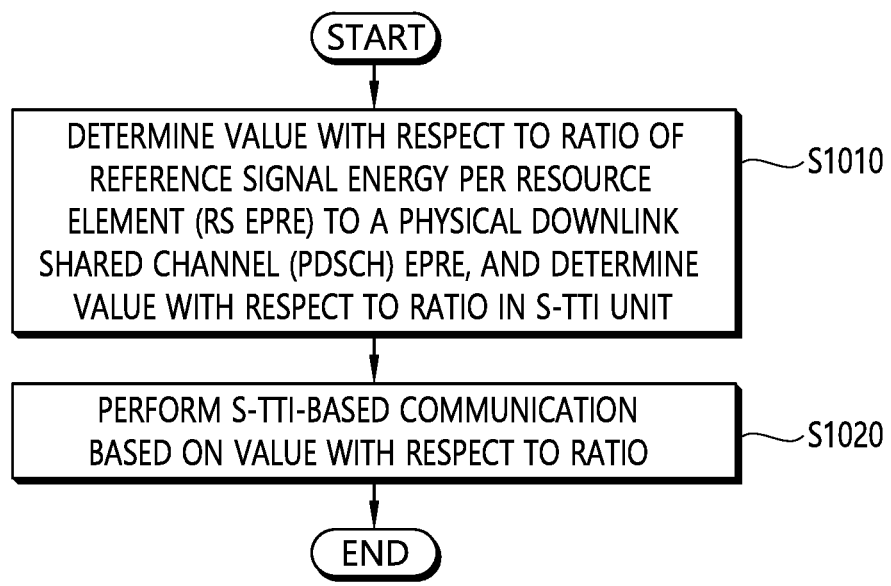
FIG. 10 is a flowchart of a method for carrying out S-TTI based communication according to an embodiment of the present document.

FIG. 10 is a flowchart of a method for carrying out S-TTI based communication according to an embodiment of the present document.

Referring to FIG. 10, the terminal may determine a value with respect to the ratio of the reference signal (RS) energy per resource element (EPRE) to the physical downlink shared channel (PDSCH) EPRE. Here, the value with respect to the ratio may be determined in the S-TTI unit, and a specific example thereof will be described later.

In this case, the terminal may be a terminal that supports a relatively short transmission time interval compared (S-TTI) to a legacy transmission time interval (L-TTI) in a wireless communication system. At this time, the terminal may be a terminal that supports not only the S-TTI but also the L-TTI.

Here, the terminal may determine whether the RS is received in a specific S-TTI of a plurality of S-TTIs.

At this time, for example, when no RS is received in the specific S-TTI, the value with respect to the ratio related to transmission power of a downlink channel on the specific S-TTI may be additionally signaled. Alternatively, for example, the downlink channel may include an S-TTI based PDSCH (S-PDSCH) or an S-TTI based physical downlink control channel (S-PDCCH).

At this time, for example, when no RS is received in the specific S-TTI, the value with respect to the ratio related to the transmission power of the downlink channel on the specific S-TTI may be set to follow a value with respect to the ratio applied to the S-TTI in which the RS is transmitted among the plurality of S-TTIs. Alternatively, for example, when no RS is received in the specific S-TTI, as the value with respect to the ratio related to the transmission power of the downlink channel on the specific S-TTI, the sum of the value with respect to the ratio applied to the S-TTI in which the RS is transmitted among the plurality of S-TTIs and the preset offset value may be applied.

Describing in detail the above contents, the following rules are as follows.

(Rule # A) S-PDSCH (/S-PDCCH) TX POWER-related RHO_A (/RHO_B) values on the S-TTI in which preset (/signaled) RSs are not transmitted may be additionally set (/signaled).

Ex) The rule may be useful when the external interference amount (the interference amount between S-TTI(s) of VICTIM cell may vary depending on the presence or absence of CRS (/CSI-RS) TX of AGRESSOR cell) is different for each S-TTI, (in particular) when TM4-based S-PDSCH (/S-PDCCH) is transmitted.

(Rule #B) The RHO_A (/RHO_B) value related to S-PDSCH (/S-PDCCH) TX POWER on the S-TTI to which the preset (/signaled) RS is not transmitted is: (1) the RS may be set (/signaled) to follow the RHO_A (/RHO_B) value applied to the transmitted S-TTI, or (2) the sum of the preset (/signaled) offset value and the RHO_A (/RHO_B) value applied to the S-TTI to which the corresponding RS is transmitted may be applied.

Here, the terminal may determine whether one S-TTI based physical downlink control channel (S-PDCCH) schedules S-TTI based PDSCHs on a plurality of S-TTIs.

In this case, for example, when the one S-PDCCH schedules S-PDSCHs on the plurality of S-TTIs, the value with respect to the ratio may be equally applied to the plurality of S-TTIs. Alternatively, for example, when there is an S-TTI in which the RS is transmitted among the plurality of S-TTIs, the value with respect to the ratio of the S-TTI in which the RS is transmitted may be applied on the plurality of S-TTIs. Alternatively, for example, when the one S-PDCCH schedules the S-PDSCHs on the plurality of S-TTIs, the value with respect to the ratio may be signaled in units of the plurality of S-TTIs. Alternatively, for example, when the one S-PDCCH schedules the S-PDSCHs on the plurality of S-TTIs, an average value of the values with respect to the ratio related to the plurality of S-TTIs may be applied to the plurality of S-TTIs. Alternatively, for example, when the one S-PDCCH schedules the S-PDSCHs on the plurality of S-TTIs, the value with respect to the ratio related to a preset S-TTI among the plurality of S-TTIs is set to the plurality of S-TTIs.

Describing in detail the above contents, the following rules are as follows.

(Rule #C) In a variable TTI environment, when one S-PDCCH schedules the S-PDSCH on the plurality of S-TTI(s) with differently set (/signaled) RHO_A (/RHO_B) values (for example, when one DCI schedules multiple S-TTI PDSCHs), the RHO_A (/RHO_B) value can be (finally) assumed according to the following rules.

Ex) When there is the S-TTI to which the RS (for example, CRS) is transmitted among the multiple S-TTI(s) scheduled with one S-PDCCH, the S-TTI related RHO_A (/RHO_B) to which the RS is transmitted may be applied to the multiple S-TTI(s).

Ex) When there is the S-TTI in which the RS (for example, CRS) is not transmitted among the multiple S-TTI(s) scheduled with one S-PDCCH, the S-TTI related RHO_A (/RHO_B) in which the RS is not transmitted can be applied to the multiple S-TTI(s). Here, as an example, (at this time), if the S-TTI-related S-PDSCH power to which the RS is not transmitted is set (/signaled) to a lower power value compared to the S-TTI to which the RS is transmitted (for example, when the CRS TX of the AGRESSOR cell is not performed and thus the interference is assumed to be relatively low), the performance of the S-PDSCH performance of the multiple S-TTI(s) may be reduced.

Ex) In the case of the multiple S-TTI(s) scheduled with one S-PDCCH, each RHO_A (/RHO_B) value (pre-set (/signaled)) may be applied to each S-TTI.

Ex) Different RHO_A (/RHO_B) values may be signaled for each VARIABLE TTI (length).

Ex) (Weighted) average value (or minimum (/maximum) value) of multiple S-TTI(s) related RHO_A (/RHO_B) values (scheduled with one S-PDCCH) is applied to the multiple S-TTI(s), or preset (/signaled) Kth S-TTI-related RHO_A (/RHO_B) (to which RS is transmitted (or not transmitted) (or on the time basis)) may be applied to the multiple S-TTI(s).

Thereafter, the terminal may perform the S-TTI based communication on the basis of the value with respect to the ratio (S1020). The example in which the terminal performs the S-TTI based communication is already described above, and therefore a detailed description thereof will be omitted.

In addition, although not separately illustrated, the embodiment of FIG. 10 may be combined (or separated) with the embodiments described below (or described above). An example in which the embodiment of FIG. 10 and the embodiment to be described later (or described above) are combined will be omitted for convenience of description.

As described above, when the terminal performs wireless communication in a specific cell, the terminal may be subjected to the interference in the S-TTI unit. Accordingly, when the terminal performs restricted CSI measurement (per preset S-TTI set), a discussion on how to determine the ratio of the reference signal EPRE and the PDSCH EPRE (per different S-TTI set in which the restricted CSI measurement is performed) is required.

Figure 11:
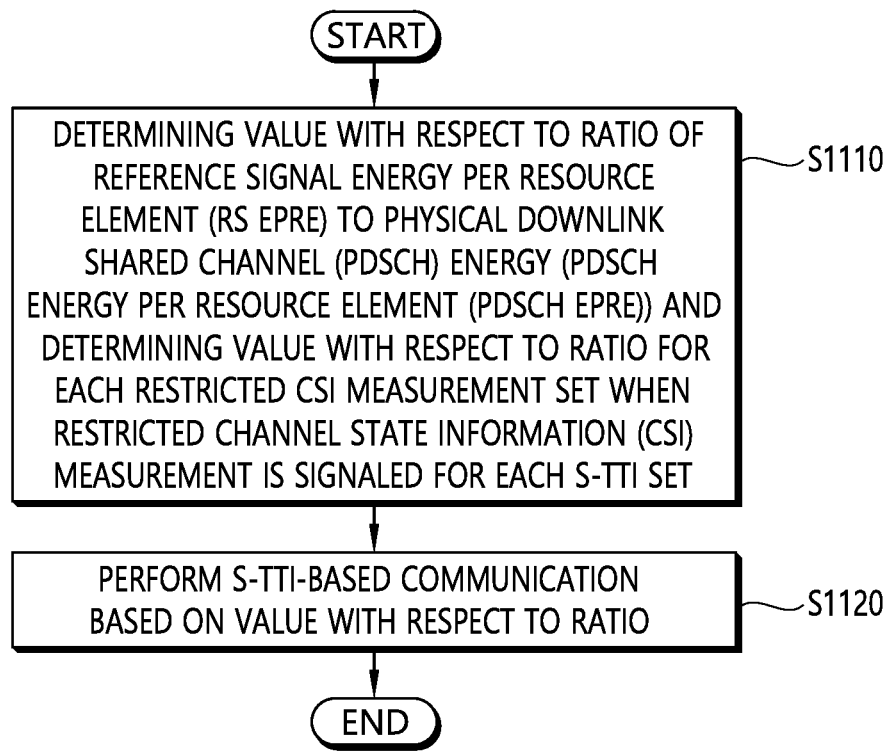
FIG. 11 is a flowchart of a method for carrying out S-TTI based communication according to another embodiment of the present document.

FIG. 11 is a flowchart of a method for carrying out S-TTI based communication according to another embodiment of the present document.

Referring to FIG. 11, the terminal may determine the value with respect to the ratio of the reference signal (RS) energy per resource element (EPRE) to the physical downlink shared channel (PDSCH) EPRE. Here, when the restricted channel state information (CSI) measurement is signaled for each S-TTI set, the value with respect to the ratio may be determined for each restricted CSI measurement set, and a specific example thereof will be described later.

In this case, the terminal may be a terminal that supports the short transmission time interval (TTI) that is relatively shorter compared to the legacy transmission time interval (L-TTI) in the wireless communication system, and the terminal at this time may be a terminal supporting not only the S-TTI but also the L-TTI.

Here, for example, the value with respect to the ratio of symbols in which the RS is received may be set differently for each of the restricted CSI measurement sets. Alternatively, for example, the value with respect to the ratio of the symbol in which the RS is not received may be set equally for all restricted CSI measurement sets.

Describing in detail the above contents, the following rules are as follows.

(Rule #D) When the restricted CSI measurement is set (/signaled) for each S-TTI set (or pre-set (/signaled) time (/frequency) resource unit set), RHO_A (/RHO_B) may be differently set (/signaled) for each restricted CSI measurement set.

Ex) RHO_B (or RHO_A) values may be applied (/set (/signaled)) in common between different restricted CSI measurement sets.

Ex) when the above rule is applied, the S-PDSCH (/S-PDCCH) reception performance of the victim cell can be efficiently guaranteed in consideration of different interference for each restricted CSI measurement set.

Thereafter, the terminal may perform the S-TTI based communication based on the value with respect to the ratio (S1120). The example in which the terminal performs the S-TTI based communication is already described above, and therefore a detailed description thereof will be omitted.

In addition, although not separately illustrated, the embodiment of FIG. 11 may be combined (or separated) with embodiments described below (or described above). An example in which the embodiment of FIG. 11 and the embodiment described later (or described above) are combined will be omitted for convenience of description.

Hereinafter, additional embodiments will be described.

(Rule #E) When the existing (legacy) RS (for example, DM-RS) form (/pattern) is split and allocated between S-TTIs (on the time axis), consecutive antenna ports (for example, port 7/8) (in a CDM form) may be mapped to adjacent (two) RS RE(s) on the frequency axis. Here, for example, when the plurality of S-TTI(s) are transmitted in a combined form, the existing antenna port mapping (/RS form (/pattern)) (per RS RE) may be (equally) applied (/assumed).

It is obvious that the examples of the suggested methods described above may be included as one of the implementation methods of the present document and therefore may also be regarded as a kind of suggested schemes. In addition, the above-described suggested methods may be independently implemented, but some suggested methods may be implemented in combined (or merged) forms. For example, the present document has described the suggested method based on the 3GPP LTE system for convenience of description, but the scope of the system to which the suggested method is applied can be extended to other systems in addition to the 3GPP LTE system. For example, the suggested methods of the present document may be restrictively applied only when the S-TTI based communication operation is set (/signaled).

Figure 12:
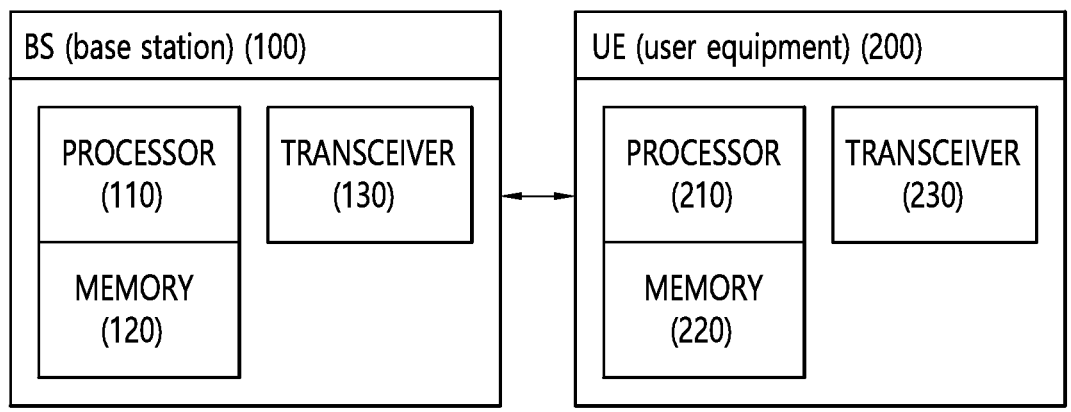
FIG. 12 is a block diagram illustrating a communication device in which the embodiment of the present document is implemented.

FIG. 12 is a block diagram illustrating a communication device in which the embodiment of the present document is implemented.

Referring to FIG. 12, a base station 100 includes a processor 110, a memory 120, and a transceiver 130. The processor 110 implements the suggested functions, processes and/or methods. The memory 120 is connected to the processor 110 and stores various information for driving the processor 110. The transceiver 130 is connected to the processor 110 and transmits and/or receives a radio signal.

The terminal 200 includes a processor 210, a memory 220, and an RF unit 230. The processor 210 implements the suggested functions, processes and/or methods. The memory 220 is connected to the processor 210 and stores various information for driving the processor 210. The transceiver 230 is connected to the processor 210 and transmits and/or receives a radio signal. The terminal 200 may perform a D2D operation to other terminals according to the above-described method.

The processors 110 and 210 may include application-specific integrated circuits (ASICs), other chipsets, a logic circuit, a data processing device, and/or a converter that mutually converts a baseband signal and a radio signal. The memories 120 and 220 may include a read-only memory (ROM), a random access memory (RAM), a flash memory, a memory card, a storage medium, and/or other storage devices. The transceivers 130 and 230 may include one or more antennas for transmitting and/or receiving radio signals. When the embodiment is implemented in software, the above-described technique may be implemented as modules (process, function, and the like) for performing the above-described functions. The module may be stored in the memories 120 and 220 and executed by the processors 110 and 210. The memories 120 and 220 may be inside or outside the processors 110 and 210, and may be connected to the processors 110 and 210 by various well-known means.

Figure 13:
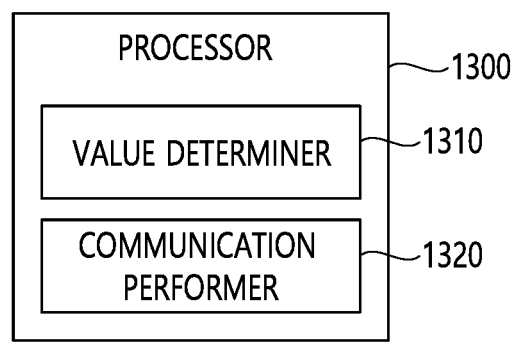
FIG. 13 is a block diagram illustrating an example of devices included in a processor.

FIG. 13 is a block diagram illustrating an example of devices included in a processor.

Referring to FIG. 13, the processor may include a value determiner 1310 and a communication performer 1320 in terms of functionality. Here, the processor may be the processor 210 of FIG. 12.

Here, the value determiner 1310 determines a value with respect to a ratio of a reference signal (RS) energy per resource element (EPRE) to a physical downlink shared channel (PDSCH) EPRE, but the value with respect to the ratio may be determined in the S-TTI unit. In addition, here, the communication performer 1320 may have a function of performing the S-TTI based communication based on the value with respect to the ratio.

The description of the device included in the above-described processor is only one example, and the processor may further include other functional elements or devices. In addition, specific examples of operations performed by each of the functional devices described above are as described above, and therefore the redundant description thereof will be omitted.

What is claimed is:

1. A method for S-TTI-based communication performed by a terminal supporting a short transmission time interval (S-TTI) that is relatively shorter compared to a legacy transmission time interval (L-TTI) in a wireless communication system, comprising:

determining a value with respect to a ratio of a reference signal energy per resource element (RS EPRE) to a physical downlink shared channel (PDSCH) energy (PDSCH energy per resource element (PDSCH EPRE));

performing the S-TTI based communication based on the value with respect to the ratio, and determining the value with respect to the ratio in the S-TTI unit; and determining whether one S-TTI based physical downlink control channel (S-PDCCH) schedules an S-TTI based PDSCH (S-PDSCH) on a plurality of S-TTIs, wherein when the one S-PDCCH schedules the S-PDSCH on the plurality of S-TTIs, the value with respect to the ratio is equally applied to the plurality of S-TTIs.

2. The method of claim 1, further comprising:

determining whether RS is received in a specific S-TTI among a plurality of S-TTIs.

3. The method of claim 2, wherein when the RS is not received in the specific S-TTI, a value with respect to a ratio related to transmission power of a downlink channel on the specific S-TTI is additionally signaled.

4. The method of claim 3, wherein the downlink channel includes the S-PDSCH or the S-PDCCH.

5. The method of claim 2, wherein when the RS is not received in the specific S-TTI, a value with respect to a ratio related to transmission power of a downlink channel on the specific S-TTI is set to follow a value with respect to a ratio applied to the S-TTI to which the RS is transmitted among the plurality of S-TTIs.

6. The method of claim 2, wherein when the RS is not received in the specific S-TTI, as a value with respect to a ratio related to transmission power of a downlink channel on the specific S-TTI, a sum of a value with respect to a ratio applied to the S-TTI to which the RS is transmitted among the plurality of S-TTIs and a preset offset value is applied.

7. The method of claim 1, wherein when the S-TTI to which the RS is transmitted among the plurality of S-TTIs, a value with respect to a ratio for the S-TTI to which the RS is transmitted is applied to the plurality of S-TTIs.

8. The method of claim 1, wherein when the one S-PDCCH schedules the S-PDSCH on the plurality of S-TTIs, a value with respect to a ratio is signaled in units of the plurality of S-TTIs.

9. The method of claim 1, wherein when the one S-PDCCH schedules the S-PDSCH on the plurality of S-TTIs, an average value of values with respect to a ratio related to the plurality of S-TTIs is applied to the plurality of S-TTIs.

10. The method of claim 1, wherein when the one S-PDCCH schedules the S-PDSCH on the plurality of S-TTIs, a value with respect to a ratio related to a preset S-TTI among the plurality of S-TTIs is applied to the plurality of S-TTIs.

11. A terminal supporting a short transmission time interval (S-TTI) that is relatively shorter compared to a legacy transmission time interval (L-TTI) in a wireless communication system, comprising:

a radio frequency (RF) transceiver configured to transmit and receive a radio signal; and a processor configured to be operated in combination with the RF transceiver, wherein the processor:

determines a value with respect to a ratio of a reference signal energy per resource element (RS EPRE) to a physical downlink shared channel (PDSCH) energy (PDSCH energy per resource element (PDSCH EPRE)), performs the S-TTI based communication based on the value with respect to the ratio and determines the value with respect to the ratio in the S-TTI unit, and determines whether one S-TTI based physical downlink control channel (S-PDCCH) schedules an S-TTI based PDSCH (S-PDSCH) on a plurality of S-TTIs, wherein when the one S-PDCCH schedules the S-PDSCH on the plurality of S-TTIs, the value with respect to the ratio is equally applied to the plurality of S-TTIs.

\* \* \* \* \*